United States Patent Office 2,693,975
Patented Nov. 9, 1954

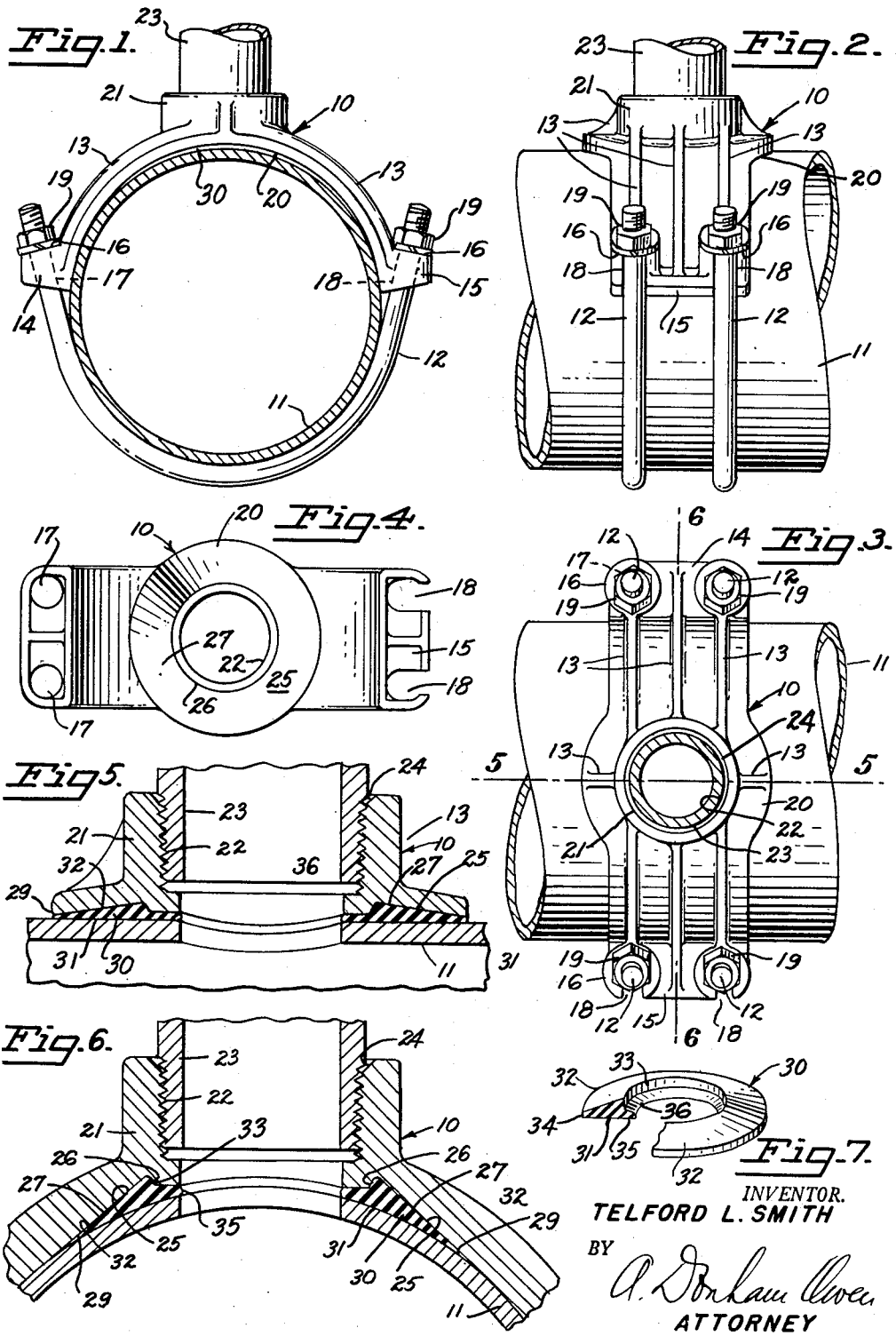

2,693,975

FLUID PRESSURE RESPONSIVE GASKET

Telford L. Smith, South San Francisco, Calif.

Application April 3, 1950, Serial No. 153,655

1 Claim. (Cl. 288—24)

This invention relates to an improved service clamp. Service clamps, also called saddles or saddle clamps, are used when branch pipes are attached to a main, whether the main be conducting gas, water, or other fluid. The clamp is secured around the upper wall of the main by strap bolts that pass under the main. A fluid-tight seal is effected around an area of the main where a hole is to be drilled. Above this area the clamp has a boss with a threaded opening therethrough. A valve may be threaded into this opening, a drilling machine attached to the valve, and a hole drilled through the wall of the main directly beneath the clamp opening. When the hole is drilled, the valve is closed, the drilling machine removed, and the branch pipe is attached to the valve.

Heretofore the sealing action of service clamps has depended almost entirely on the main strength and pressure exerted by the strap bolts and their nuts. There has always been the danger of placing too much clamping pressure on the main, and there has always been the problem of preventing leakage. Moreover, leakage has tended to increase with increases in fluid pressure.

This invention has solved these problems and makes it possible to obtain an improved seal with much less pressure on the bolts. By a new construction, the sealing gasket is subjected to a wedging action between the main and the clamps. The tightening of the bolts increases the wedging action, and so does an increase in fluid pressure. The wedging action always operates to increase the sealing action of the gasket. It even makes it possible to seal tightly on a main having a rough or pitted surface.

My new clamp is also easier to install than former clamps, and it can be installed more quickly.

The improved clamp includes a saddle with a boss or riser outlet that is threaded to receive the branch pipe. Around the base of the boss, where the under surface of the saddle rests on the outer wall of the main, the saddle is provided with a tapered annular recess. The recess extends out radially from an annular shoulder at its inner end and tapers smoothly into the semi-cylindrical inner surface of the clamp. The annular gasket that fits into this recess has a smoothly tapering outer rim and a blunt inner rim that presents a large surface area to the fluid. The fluid pressure against this large surface tends to wedge the gasket radially outwardly into the tapered recess and thus tightens the sealing action.

A particular form of the invention will now be described in accordance with United States Revised Statutes, Section 4888. However, it should be understood that the description is illustrative and is not intended to narrowly limit the claims.

In the drawings:

Fig. 1 is a view in elevation of a service clamp embodying the invention installed on a main, the main being shown in section, and with a branch pipe threaded into the clamp.

Fig. 2 is a view in side elevation of the clamp, main, and branch pipe of Fig. 1.

Fig. 3 is a top plan view of the assembly shown in Figs. 1 and 2.

Fig. 4 is a bottom plan view of the saddle.

Fig. 5 is an enlarged fragmentary view in section taken along the line 5—5 of Fig. 3.

Fig. 6 is a view similar to Fig. 5 taken along the line 6—6 of Fig. 3.

Fig. 7 is a view in perspective and partly in section of the gasket.

The service clamp shown in the drawings includes a saddle 10 held around a main 11 by a pair of metal straps 12. The saddle 10 extends approximately half way around the main 11. It may be made of brass or other strong malleable metal and may have reinforcing ribs 13.

At each side of the saddle 10 is a lug 14, 15. The lugs have outwardly sloping shoulders 16 and inwardly sloping openings 17 and 18 therethrough. The openings 17 on the lugs 14 are enclosed and may be circular, but the openings 18 on the lugs 15 are preferably open-end slots. This construction enables quick installation of the clamp. The straps 12 may be secured to the lugs 14 first, by nuts 19, then slid into the slots 18 and held there by other nuts 19, instead of having to fit each strap 12 into two closed openings at once.

At its upper central portion the saddle 10 includes a generally-circular wider portion 20 on which is a central boss 21. The boss 21 has an opening 22 where a branch pipe 23 may be threaded. The boss 21 may be chamfered at the upper end 24 of the opening 22.

Around the lower end of the opening 22 is an annular tapered recess 25 that receives a gasket 30. The recess 25 is wedge-shaped when seen in cross-section, with the wide portion adjacent an annular lip or shoulder 26. Viewed along the crest, as in Fig. 5, the recess 25 is shaped like a flat wedge. Viewed along the curve, as in Fig. 6, it is like a curved wedge. The shoulder 26 and the adjacent wall 27 act as a driving point against the gasket 30, and as the clamp is tightened these parts of the saddle exert a greatly increased amount of pressure on the gasket 30 that tends to drive it radially outwardly toward the outer end 29 of the tapered recess 25.

The resilient gasket 30 (see Fig. 7) includes a lower face 31 that is substantially flat before it is installed, but bends to conform to the pipe 11 as it is compressed by the clamp. The gasket's upper face 32 slopes downwardly from a rounded shoulder 33 at its inner rim to a narrow outer rim 34. The gasket's shoulder 33 fits against the saddle's shoulder 26 and the wall portion 27.

An inner lip 35 of the gasket 30 extends radially inwardly beyond the shoulder 33, being joined thereto by a ledge 36. This lip 35, ledge 36, and shoulder 33 provide a considerable area against which the fluid may press to wedge the gasket 30 radially outwardly in the recess 25. The greater the fluid pressure the greater is the sealing pressure applied to the gasket on its two faces 31 and 32. Thus its sealing action is increased by an increase in the fluid pressure as well as by an increase in the clamping pressure. If either the radially outward force of fluid pressure or the downward clamping force is increased, the gasket 30 is wedged tighter against the wall of the main 11 and the saddle 10 and seals all the more tightly.

For installation, the saddle 10, with the gasket 30 inside the tapered portion 25, is placed over the main 11. One end of each of the straps 12 is passed through the openings 17 and bolted to the lug 14. The other ends of the straps 12 are then slid into the slots 18 and secured to the lug 15 by the nuts 19.

As the nuts 19 are tightened on both sides of the saddle 10, the gasket 30, is conformed to the main 11 and is squeezed between the main 11 and the clamp 10 in the recess 25. It seals against even rough surfaces because it is wedged in tightly over a considerable surface.

When the clamp 10 is tightly in place, a valve may be screwed into the boss 21, and a machine may be attached to the valve to drill a hole through the pipe. When the hole is drilled, the machine is removed, a pipe is threaded into the valve and service is carried to the new house. The water pressure will help seal the gasket against the clamp 10 and main 11, as the fluid presses against the lip 35, the shoulder 33, and ledge 36, forcing the tapered gasket 30 further into the tapered recess 25.

I claim:

A gasket for sealing between an arcuate portion of a generally semi-cylindrical service clamp and an arcuate portion of a generally cylindrical pipe wall around a generally circular opening through said pipe wall, said gasket comprising a flexible resilient molded rubber annulus with one substantially flat radial face and with a second generally radial face having a radially outer major portion and a radially inner minor portion joined by a generally axial shoulder spaced away from and extending generally perpendicular to the plane of said flat face, the apex of said shoulder being where the gasket is the thickest and being rounded, said outer major face portion sloping down from said apex and converging toward said flat face as it extends radially outwardly and terminating in a very narrow outer axial rim, the slope of said outer face portion being inclined at about 20° to said flat face, said inner minor face portion sloping the opposite direction to said major portion from the base of said shoulder in to a thin inner axial rim so as to form with said flat face a thin generally-radially-extending lip, so that water pressure against said lip and said shoulder, on the non-flat radial face can aid in wedging said gasket radially outwardly between said service clamp and said pipe, the flexibility of said gasket being sufficient for installation with the flat-molded radial face assuming the cylindrical shape required.

References Cited in the file of this patent

UNITED STATES PATENTS

| Number | Name | Date |
|---|---|---|
| 684,084 | Mueller | Oct. 8, 1901 |
| 798,441 | Nelson | Aug. 29, 1905 |
| 852,682 | Schuermann | May 7, 1907 |
| 853,900 | Saunders | May 14, 1907 |
| 906,849 | Baashuus | Dec. 15, 1908 |
| 963,498 | Bard | July 5, 1910 |
| 1,178,234 | Hayden | Apr. 4, 1916 |
| 1,191,887 | Glauber | July 18, 1916 |
| 1,459,030 | Mueller | June 19, 1923 |
| 2,316,974 | Risley | Apr. 20, 1943 |
| 2,488,064 | Mueller | Nov. 15, 1949 |
| 2,538,186 | Boucher | Jan. 16, 1951 |

FOREIGN PATENTS

| Number | Country | Date |
|---|---|---|
| 727,099 | France | June 13, 1932 |
| 39,741 | Netherlands | Dec. 15, 1936 |